United States Patent
Kernkamp

(10) Patent No.: US 10,865,047 B1
(45) Date of Patent: Dec. 15, 2020

(54) COMBINE AUGERS AND COMBINE AUGER REPAIR METHODS

(71) Applicant: Mike Kernkamp, Rosalia, WA (US)

(72) Inventor: Mike Kernkamp, Rosalia, WA (US)

( * ) Notice: Subject to any disclaimer, the term of this patent is extended or adjusted under 35 U.S.C. 154(b) by 0 days.

(21) Appl. No.: 16/197,951

(22) Filed: Nov. 21, 2018

Related U.S. Application Data

(60) Provisional application No. 62/609,888, filed on Dec. 22, 2017.

(51) Int. Cl.
  *B65G 33/24* (2006.01)
  *A01D 61/00* (2006.01)
  *B65G 33/26* (2006.01)

(52) U.S. Cl.
  CPC ............ *B65G 33/24* (2013.01); *A01D 61/004* (2013.01); *B65G 33/265* (2013.01)

(58) Field of Classification Search
  CPC ........ B65G 33/10; B65G 33/24; B65G 33/26; B65G 33/265; A01D 61/004; A01D 61/008
  See application file for complete search history.

(56) References Cited

U.S. PATENT DOCUMENTS

| | | | |
|---|---|---|---|
| 292,550 A | 1/1884 | Fairly | |
| 2,397,305 A | 3/1946 | Wheat | |
| 3,060,665 A * | 10/1962 | Escher | A01D 61/008 56/16.4 R |
| 3,194,385 A | 7/1965 | Barnese | |
| 3,485,341 A | 12/1969 | Lutz | |
| 3,762,537 A * | 10/1973 | Lutz | E01C 19/48 198/664 |
| 3,794,046 A * | 2/1974 | Muijs | A01D 41/14 460/78 |
| 3,964,492 A | 6/1976 | Crego et al. | |
| 4,242,002 A * | 12/1980 | Kawabata | B01F 7/00025 241/172 |
| 4,398,607 A * | 8/1983 | Reichardt | B65G 33/265 172/119 |
| 5,433,577 A * | 7/1995 | Roycraft | B02C 19/22 198/677 |
| 9,089,094 B1 | 7/2015 | Kile | |
| 9,409,365 B2 * | 8/2016 | Doppstadt | B65G 33/26 |

* cited by examiner

*Primary Examiner* — Gene O Crawford
*Assistant Examiner* — Keith R Campbell
(74) *Attorney, Agent, or Firm* — Wells St. John P.S.

(57) ABSTRACT

Repaired combine augers are provided that can include: a central cylindrical object configured to support flighting extending about the central cylindrical object, wherein at least one portion of the flighting is damaged and defines non-linear portions, openings, and/or bent sections; and at least one semi-circular repair component bound to the portion to align with remainder of the flighting. Methods for repairing a damaged combine auger are provided. The methods can include: identifying at least one damaged portion of flighting of the auger; and coupling at least one semi-circle repair component to the damaged portion of the flighting to provide a linear edge continuous with remainder of the flighting.

7 Claims, 5 Drawing Sheets

COMBINE AUGERS AND COMBINE AUGER REPAIR METHODS

CROSS REFERENCE TO RELATED APPLICATION

This application claims priority to and the benefit of U.S. Provisional Patent Application Ser. No. 62/609,888 filed Dec. 22, 2017, entitled "Combine Augers and Combine Auger Repair Methods", the entirety of which is incorporated by reference herein.

TECHNICAL FIELD

The present disclosure relates to combine augers generally, and in particular embodiments, to combine augers and combine auger repair methods.

BACKGROUND

Combine augers can become damaged through use in the field as they encounter various obstacles that are associated with harvesting crops. The typical damage is encountered during the combining process when the auger, particularly the flighting of the auger, contacts objects in the soil that damage the flighting, in some cases, wearing the flighting to non-existence.

Typically, augers are flighting supported by a central cylindrical object. The flighting is aligned so that when the central cylindrical object is rotated, material in between the flighting is processed or transported in a direction defined by the angle on the flighting on the central cylindrical object. The flighting can become damaged, and thereby inhibit the process of transferring material in the desired direction. The present disclosure provides combine augers and combine auger repair methods.

SUMMARY

Repaired combine augers are provided that can include: a central cylindrical object configured to support flighting extending about the central cylindrical object, wherein at least one portion of the flighting is damaged and defines non-linear portions, openings, and/or bent sections; and at least one semi-circular repair component bound to the portion to align with remainder of the flighting.

Methods for repairing a damaged combine auger are provided. The methods can include: identifying at least one damaged portion of flighting of the auger; and coupling at least one semi-circle repair component to the damaged portion of the flighting to provide a linear edge continuous with remainder of the flighting.

DRAWINGS

Embodiments of the disclosure are described below with reference to the following accompanying drawings.

DESCRIPTION

This disclosure is submitted in furtherance of the constitutional purposes of the U.S. Patent Laws "to promote the progress of science and useful arts" (Article 1, Section 8).

Figure 2:
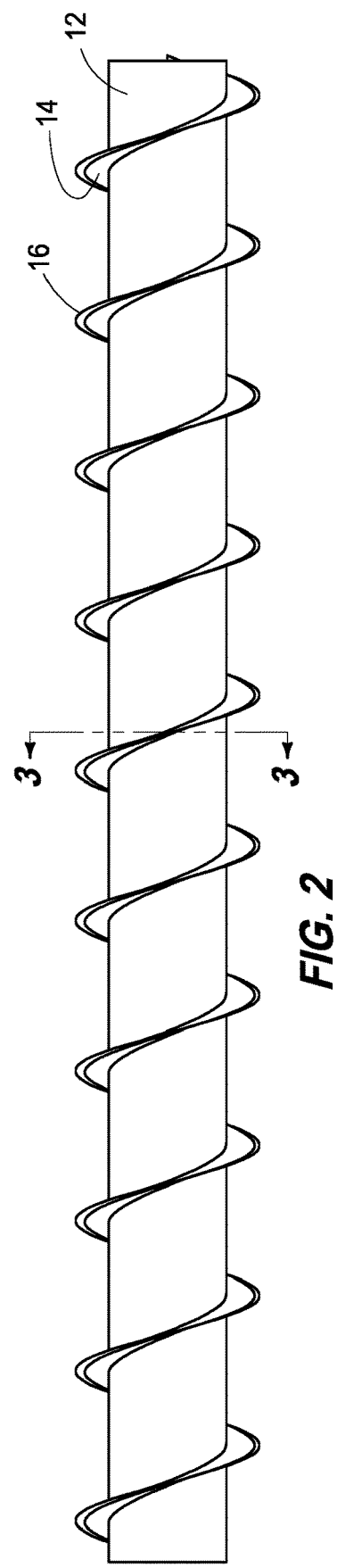
FIG. 2 is an elevational view of the combine auger of FIG. 1 according to an embodiment of the disclosure.
Figure 1:
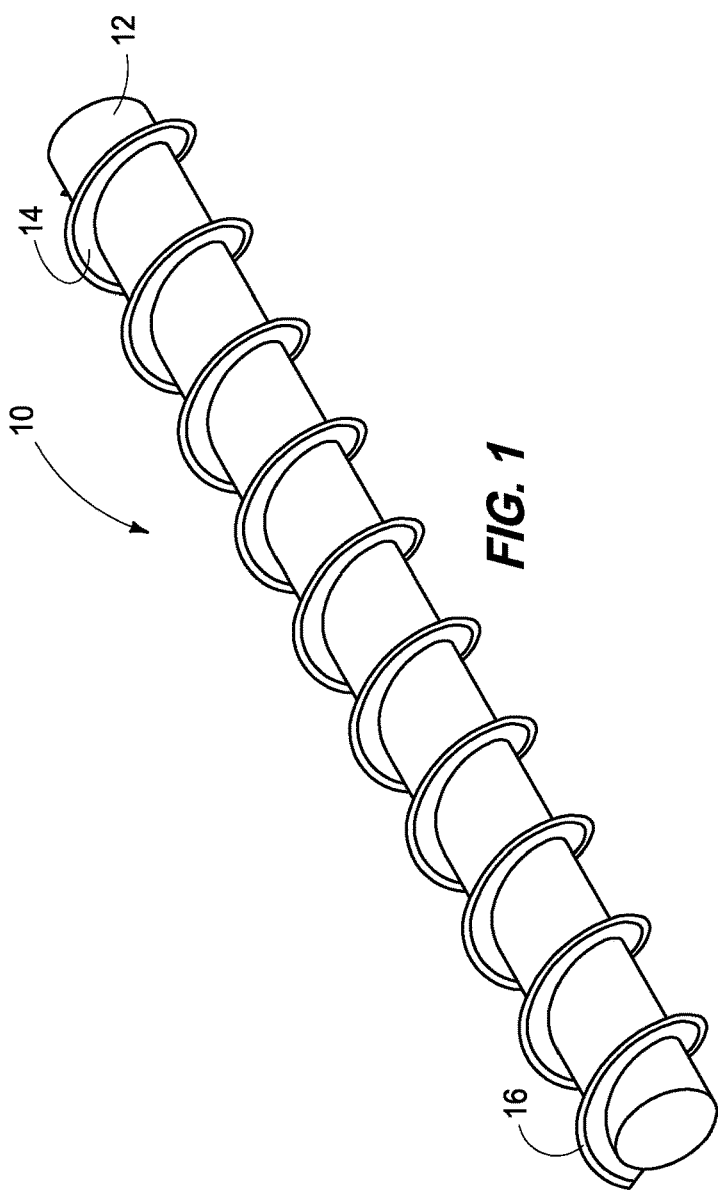
FIG. 1 is a perspective view of a combine auger according to an embodiment of the disclosure.

The combine auger and combine auger repair methods of the present disclosure will be described with reference to FIGS. 1-6. Referring first to FIG. 1, combine auger 10 is shown that includes cylindrical central portion 12 having flighting 14 thereabout. As can be seen, flighting 14 is provided in a spiral direction, increasing in depth as the direction proceeds from left to right, for example, in this embodiment. In accordance with example implementations, flighting 14 is curved about cylindrical central portion 12. Referring to FIG. 2, flighting 14 can have edges 16, and these edges 16 can be repaired utilizing the embodiments of the present disclosure. In accordance with example implementations, it has been realized that repair cannot be in a single strip that repairs the edges of flighting 14; rather, multiple strips can be provided with each of the multiple strips covering no more than a semicircle or half circle of the flighting. Therefore, at least two strips per revolution of flighting can be required, however more than two strips per revolution may be utilized.

Figure 3:
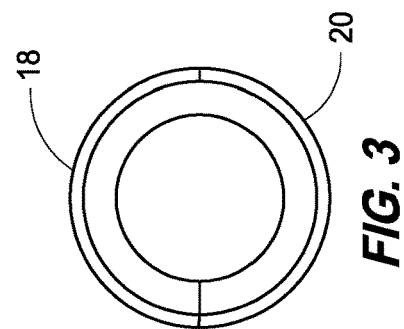
FIG. 3 is a cross sectional view of the combine auger of FIGS. 1 and 2 according to an embodiment of the disclosure.
Figure 4A:
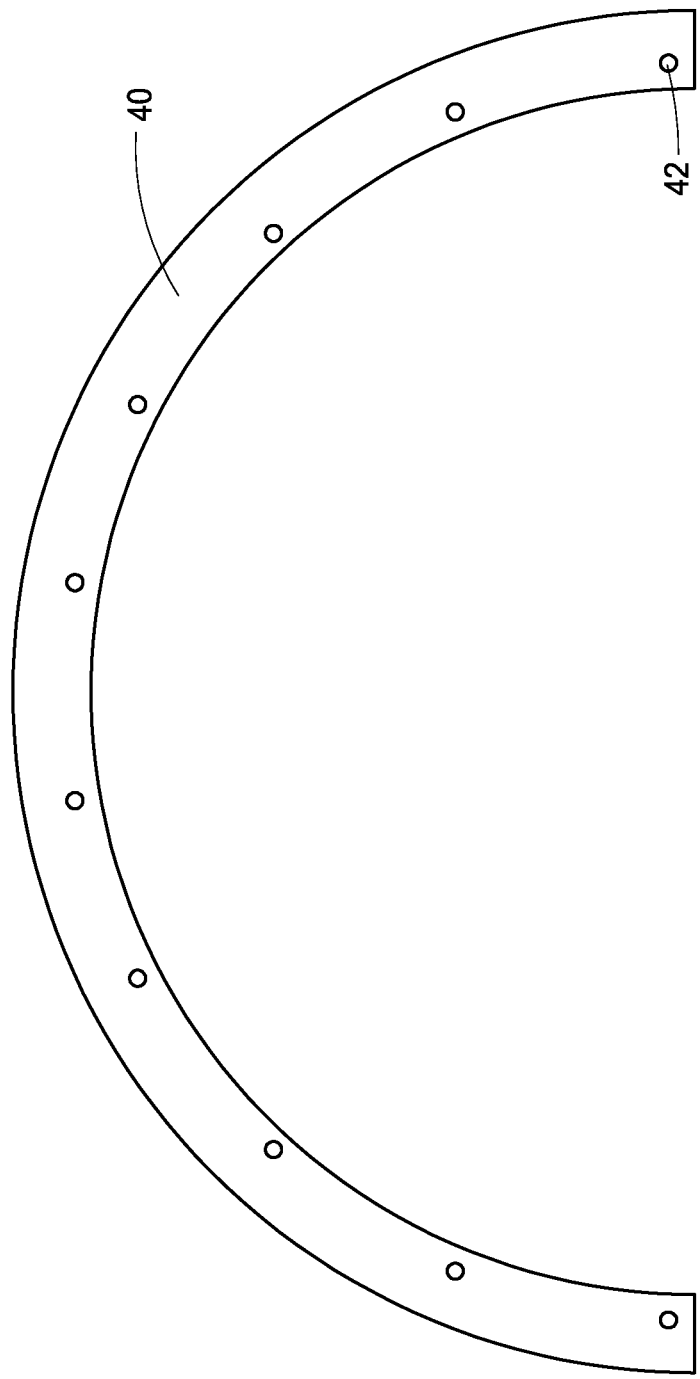
FIG. 4A is a portion of a repair component according to an embodiment of the disclosure.
Figure 4B:
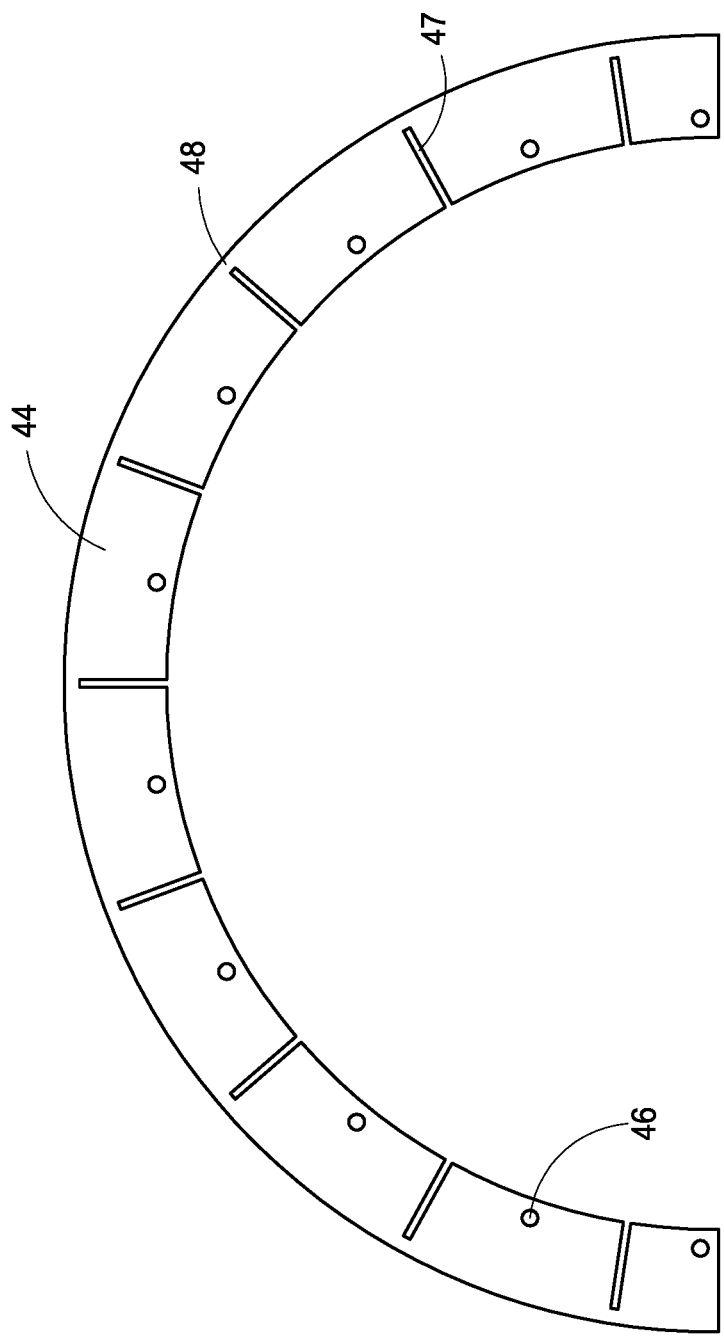
FIG. 4B is a portion of a repair component according to another embodiment of the disclosure.

Referring to FIG. 3, in accordance with example implementations, two of the repair components such as strips 18 and 20 are shown in the cross section engaging flighting 14. Referring to FIG. 4A, an example flighting repair component 40 is shown that includes multiple perforations 42 extending about flighting repair component 40. In accordance with example implementations, this flighting repair component can be a half circle, or at least less than a half circle. The structure of the component itself can be of a width thin enough to allow for at least partial twisting of flighting component 40. In accordance with example implementations, repair component 40 can be constructed of steel, for example. Referring to FIG. 4B, another example flighting repair component is shown. Component 44 can have multiple recesses 47 that separate teeth 46 but are mounted to a continuous portion 48.

Figure 5:
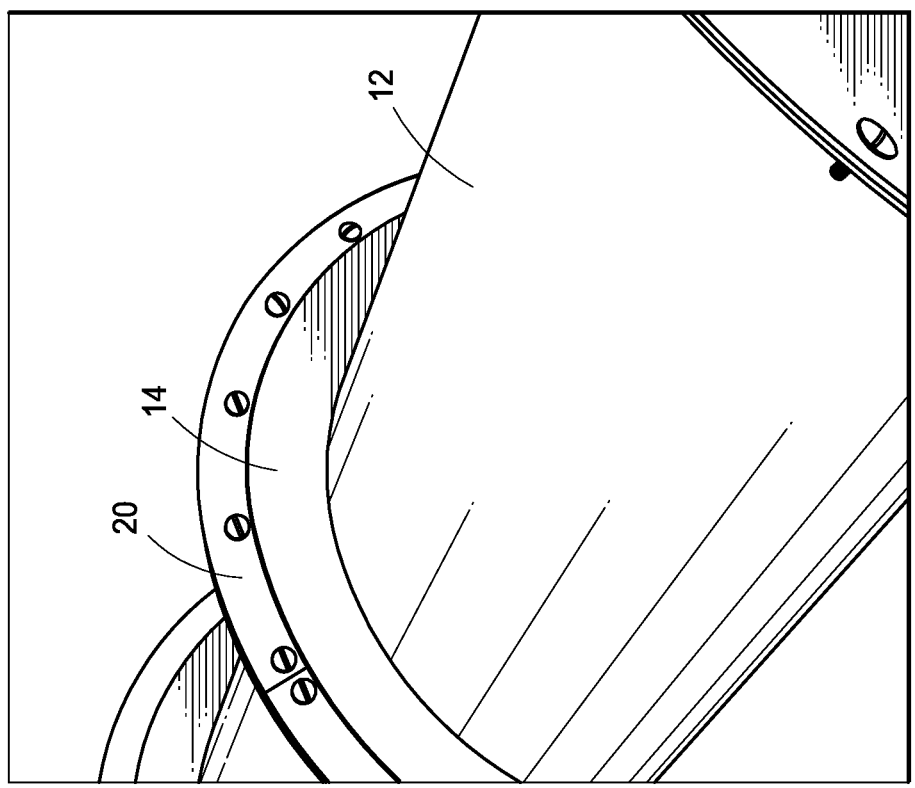
FIG. 5 is a depiction of a repaired combine auger according to an embodiment of the disclosure.

Referring next to FIG. 5, a repaired auger is shown and depicted that includes flighting repair components 40 about flighting 16. In accordance with example implementations, these flighting components are abutted one against the other as they continue about the flighting tips 16. As seen, the components 40 can be affixed to flighting 14 utilizing bolts, for example. Other coupling methods such as welding and/or riveting may be utilized as well.

Figure 6:
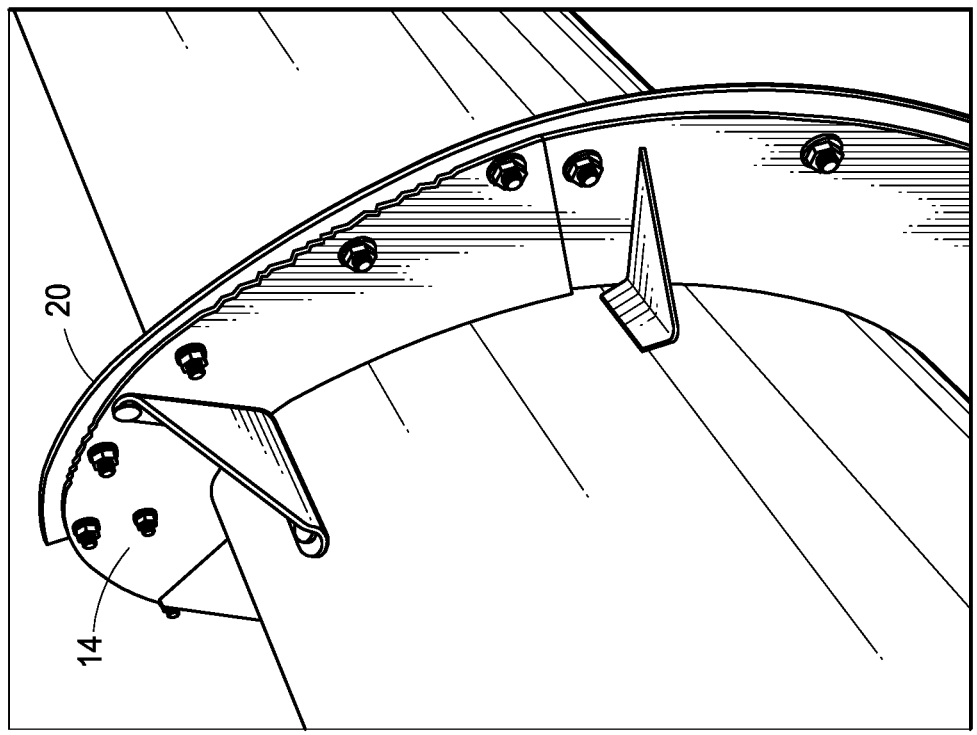
FIG. 6 is yet another depiction of a repaired combine auger according to an embodiment of the disclosure.

Referring next to FIG. 6, another view of a repaired auger component is shown depicting flighting components 40 coupled to flighting 14. As can be seen, flighting component 40 is coupled to just a single side of the flighting, rather than both sides.

In accordance with example implementations, the present disclosure provides auger repair methods utilizing semi-circle or half circle tip repair means as shown.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect.

The invention claimed is:

1. A method for repairing a damaged combine auger, the method comprising:
   identifying at least one damaged edge portion of flighting of the auger; and
   coupling at least one semi-circle repair component to the damaged portion of the flighting to provide a linear edge continuous with remainder of the flighting, wherein the semi-circle repair component defines a rectangle in at least one cross section, the rectangle having opposing sidewalls between opposing component edges, wherein one of the component edges is substantially aligned with the damaged edge portion.

2. The method of claim 1 further comprising twisting the one repair component during the coupling to provide the linear edge.

3. The method of claim 1 further comprising extending the at least one repair component about a half-circle portion of the flighting.

4. The method of claim 1 further coupling another semi-circle repair component to another damaged portion to provide a linear edge continuous with a remainder of the flighting.

5. The method of claim 4 wherein both repair components extend about a full circle portion of the flighting.

6. The method of claim 4 further comprising abutting the one and the other repair components.

7. The method of claim 4 further comprising providing space between the one and the other repair components along the flighting.

* * * * *